(12) United States Patent
Webb et al.

(10) Patent No.: US 6,775,159 B2
(45) Date of Patent: Aug. 10, 2004

(54) SWITCHING POWER CONVERTER CIRCUITS PROVIDING MAIN AND AUXILIARY OUTPUT VOLTAGES

(75) Inventors: Kenneth F. Webb, Cedar Rapids, IA (US); Jian Sun, Cedar Rapids, IA (US)

(73) Assignee: Rockwell Scientific Company, LLC., Thousand Oaks, CA (US)

( * ) Notice: Subject to any disclaimer, the term of this patent is extended or adjusted under 35 U.S.C. 154(b) by 0 days.

(21) Appl. No.: 10/080,026

(22) Filed: Feb. 21, 2002

(65) Prior Publication Data

US 2002/0114172 A1 Aug. 22, 2002

(30) Foreign Application Priority Data

Feb. 19, 2001 (JP) ....................................... 2001-041665

(51) Int. Cl.[7] ............................................... H02M 5/42
(52) U.S. Cl. ........................................................ 363/89
(58) Field of Search .............................. 363/89; 307/17, 307/31, 32, 33, 34, 35

(56) References Cited

U.S. PATENT DOCUMENTS

| | | | | |
|---|---|---|---|---|
| 3,358,210 A | * | 12/1967 | Grossoehme | 363/80 |
| 4,471,423 A | * | 9/1984 | Hase | 363/90 |
| 4,581,691 A | * | 4/1986 | Hock | 363/21.12 |
| 4,660,136 A | * | 4/1987 | Montorefano | 363/26 |
| 4,999,759 A | * | 3/1991 | Cavagnolo et al. | 363/21.01 |
| 6,501,193 B1 | * | 12/2002 | Krugly | 307/31 |

* cited by examiner

*Primary Examiner*—Shawn Riley

(57) ABSTRACT

A converter circuit includes a magnetic core, a primary winding, a secondary winding, a main rectification circuit, and an auxiliary rectification circuit. The primary winding and the secondary winding are wound around the magnetic core. The main rectification circuit and the auxiliary rectification circuit are both connected to the secondary winding and produce output voltages having different magnitudes. The auxiliary voltage powers the control and drive circuits for both the primary switches and the synchronous rectifiers used for the main rectification circuit.

22 Claims, 4 Drawing Sheets

US 6,775,159 B2

SWITCHING POWER CONVERTER CIRCUITS PROVIDING MAIN AND AUXILIARY OUTPUT VOLTAGES

The U.S. Government has a paid-up license in this invention and the right in limited circumstances to require the patent owner to license others on reasonable terms as provided for by the terms of the contract number N00014-99-3-0006 awarded by the United States Navy.

FIELD OF THE INVENTION

This invention relates to switching power converter circuits and methods and, in particular, relates to a converter circuit and method with an auxiliary supply voltage.

BACKGROUND OF THE INVENTION

Switching power converters are used in a wide variety of applications to convert electrical power from one form to another form. For example, dc/dc converters are used to convert dc power provided at one voltage level to dc power at another voltage level. One application in which dc/dc converters are used is to provide a supply voltage to microprocessors and other digital devices. To provide this supply voltage, transformer coupled converters are commonly used, especially when isolation between the input and output voltages is required, or when the input voltage to the converter is much higher than the output voltage which is supplied to the microprocessor.

In typical transformer coupled converters, an input voltage is applied to a primary winding and electrical power is transferred through a transformer core to a rectification circuit coupled to a secondary winding. Secondary current flows in the secondary winding, and the secondary current is rectified and used to charge an output capacitor of the converter circuit. In a simple converter circuit, the rectifier is a diode.

Newer microprocessors require lower supply voltages, for example, in the range of one to three volts. In order to promote efficient operation at this output voltage range, synchronous rectifiers have been employed instead of diodes in rectification circuits of dc/dc converters. However, synchronous rectifiers often require a gate drive voltage which is higher (e.g., 5–10 volts) than the converter output voltage which is supplied to the microprocessor. Gate drive amplifiers and other control circuitry on the secondary side also may need a higher supply voltage.

Therefore, a need exists for a converter circuit that is capable of providing an auxiliary output voltage to provide power for devices that operate at a voltage level that is different than the voltage level of the main output voltage of the converter circuit.

SUMMARY OF THE INVENTION

According to a first preferred aspect, a converter circuit comprises a transformer core, a primary winding, a secondary winding, a main rectification circuit, an auxiliary rectification circuit. The primary winding and the secondary winding are wound around the transformer core. The main rectification circuit and the auxiliary rectification circuit are both connected to the secondary winding and produce output voltages having different magnitudes.

According to a second preferred aspect, a dc/dc converter circuit comprises a transformer core, a primary winding, a secondary winding, a main rectification circuit, an auxiliary rectification circuit, a drive circuit, and a drive control circuit. The primary winding and the secondary winding are wound around the transformer core. The main rectification circuit is connected to the secondary winding. The main rectification circuit further comprises a first output capacitor and a rectifier that controls current flow through the first output capacitor. An output voltage of the main rectification circuit is produced across the first output capacitor.

The auxiliary rectification circuit is connected to the secondary winding. The auxiliary rectification circuit further comprises a second output capacitor. An output voltage of the auxiliary rectification circuit is produced across the second output capacitor. The output voltage of the auxiliary rectification circuit has a magnitude which is different than a magnitude of the output voltage of the main rectification circuit.

The drive circuit is coupled to receive a supply voltage. The drive control circuit is coupled to the drive circuit and controls the drive circuit to apply a pulse width modulated dc voltage to the primary winding. The drive control circuit controls the rectifier to synchronize operation of the rectifier to the pulse width modulated voltage. The drive control circuit is connected to receive the output voltage produced by the auxiliary rectification circuit, the drive control circuit using the output voltage produced by the auxiliary rectification circuit to produce a control signal for the rectifier. The control signal has a voltage magnitude which is determined at least in part by the magnitude of the output voltage of the auxiliary rectification circuit.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE PREFERRED EMBODIMENTS

Figure 1:
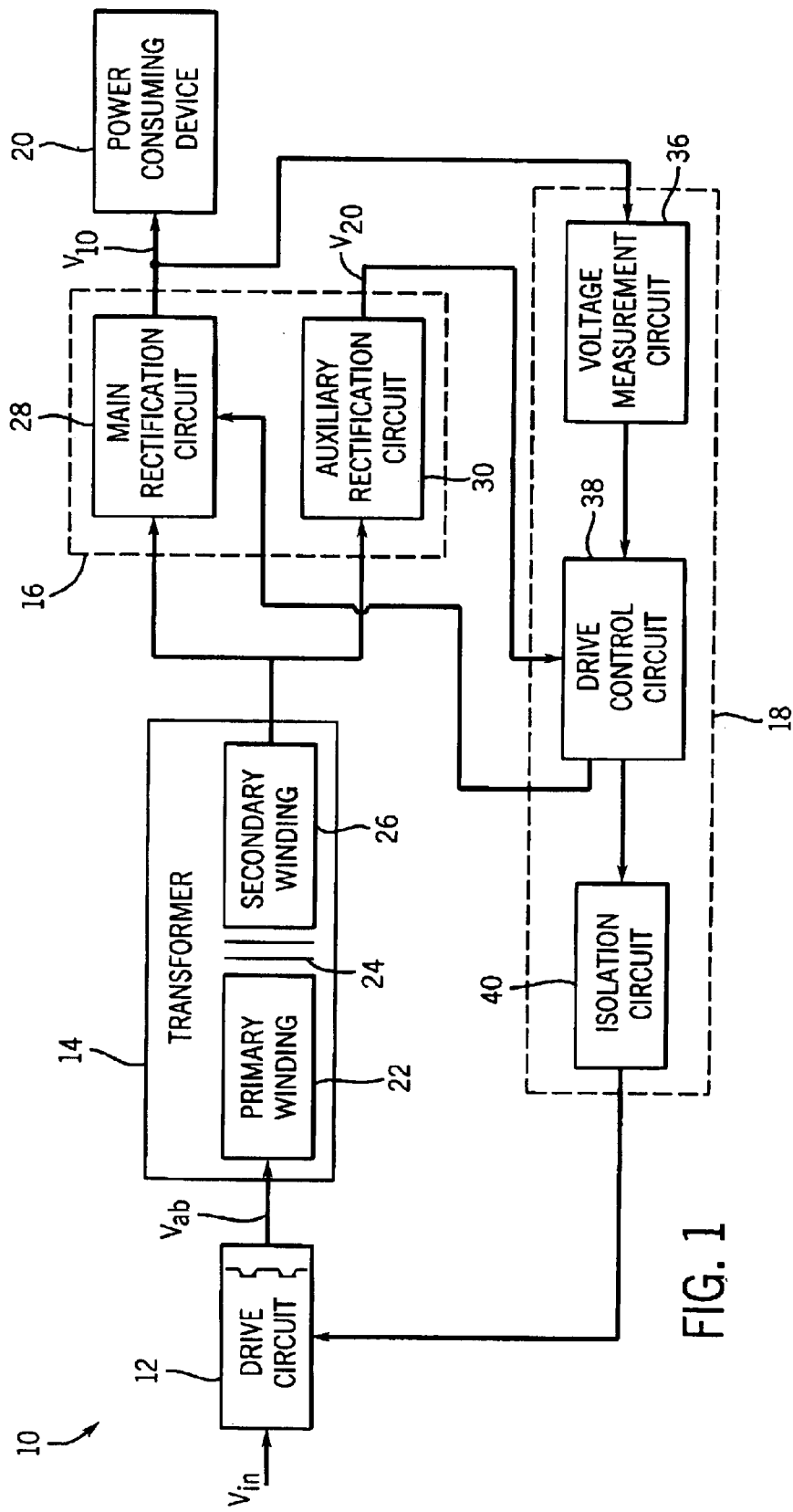
FIG. 1 is a block diagram of a dc/dc converter circuit according to a preferred embodiment of the invention.

Referring now to FIG. 1, a block diagram of a DC/DC converter circuit according to a preferred embodiment of the invention is shown. The converter circuit 10 comprises a drive circuit 12, a transformer 14, a rectification circuit 16, and a feedback control circuit 18. The converter circuit is used to provide power to a power-consuming device 20, which may for example be a microprocessor, a digital circuit, or other device.

The converter circuit 10 receives an input voltage $V_{in}$ at the drive circuit 12. The drive circuit 12 is a switch circuit that operates under the control of the feedback control circuit 18. To prevent the transformer 14 from saturating due to continuous application of a dc input voltage and to control the main output voltage, the drive circuit 12 provides a pulse-width modulated input voltage $V_{ab}$ to the transformer 14. The duty cycle of the pulse width modulation is controlled so as to minimize deviation of an output voltage $V_{10}$ of the converter circuit 10 from a predetermined setpoint level.

The drive circuit 12 may have a variety of conventional configurations, such as a single ended or double ended half bridge, full bridge or push pull topology. In a single ended topology, the drive circuit 12 is capable of switching the input voltage $V_{ab}$ between open circuit and the input voltage $V_{in}$ (0, $+V_{in}$). In a double ended topology, the drive circuit 12 is capable of switching the input voltage $V_{ab}$ between a positive that is equal or proportional to the input voltage $V_{in}$, a negative that is equal or proportional to the input voltage $V_{in}$, and an open circuit. In all of the different configurations, the drive circuit 12 comprises at least one switch (such as MOSFETs or other transistors) as well as possibly other circuit components such as capacitors.

The transformer 14 comprises a primary winding 22, a transformer core 24, and a secondary winding 26. The primary winding 22 and the secondary winding 26 are wound around the transformer core 24. The primary winding 22 receives the current provided by the drive circuit 12 and, in response to the current in the primary winding 22, the secondary winding 26 produces a secondary current. The secondary current flows through the rectification circuit 16 and is split between a main rectification circuit 28 and an auxiliary rectification circuit 30. The main rectification circuit produces an output voltage $V_{10}$ which is the output of the converter circuit 10 and is provided to the power consuming device 20 (e.g., a microprocessor, digital circuit, or other device). The auxiliary rectification circuit produces an output voltage $V_{20}$ which has a different magnitude than the output voltage $V_{10}$ and which is provided to the feedback control circuit 18.

The feedback control circuit 18 comprises a voltage measurement circuit 36, a drive control circuit 38, and an isolation circuit 40. The voltage measurement circuit 36 measures the output voltage $V_{10}$ of the main rectification circuit 28. The drive control circuit 38 generates control signals for the drive circuit 12. The control signals are generated so as to vary the duty cycle of the voltage $V_{ab}$ and thereby maintain the output voltage $V_{10}$ at a predetermined level. The drive control circuit may implement a linear feedback controller, a hysterisis controller, or other type of control circuit. The control signals from the drive control circuit 38 are fed through the isolation circuit 40 to the drive circuit 12. The isolation circuit 40 may comprise, for example, an isolation transformer to maintain electrical isolation between the components on either side of the transformer core 24. The drive control circuit 38 is powered by the output voltage $V_{20}$ generated from the auxiliary rectification circuit 30. The drive control circuit 38 also generates control signals for the synchronous rectifiers of the main rectification circuit 28.

Assuming the main rectification circuit 28 provides power to a device such as a microprocessor, and the auxiliary rectification provides power to the drive control circuit 38, the main rectification circuit 28 provides more output power than the auxiliary rectification circuit. For example, the main rectification circuit 142 may provide power in the range of about fifty watts or more whereas the auxiliary rectification circuit 144 may provide power in the range of about five watts or less to the drive control circuit 38 and the drive circuit 12.

Referring now to FIGS. 2–5, various preferred embodiments 116, 216, 316, 416 of the rectification circuit 16 of FIG. 1 are shown. Also shown coupled to each of the rectification circuits 116, 216, 316, 416 is a secondary winding 126, 226, 326, 426, respectively. The secondary windings 126, 226, 326, and 426 correspond to the secondary winding 26 of FIG. 1, and are shown in FIGS. 2–5 to show the interconnection of the secondary winding with the components of the rectification circuits 116, 216, 316, 416. The main rectification circuits 128, 228, 328 and 428 in FIGS. 2–5 correspond to the main rectification circuit 28 in FIG. 1. Although the rectifiers in the main rectification circuits 128, 228, 328, and 428 in FIGS. 2–5 are shown to be diodes, it is understood that they may be implemented using synchronous rectifiers, especially for low output voltage applications. The auxiliary rectification circuits 130, 230, 330, 430 correspond to the auxiliary rectification circuit 30 in FIG. 1. It may also be noted that a "dot" is shown on each of the secondary windings 126, 226, 326, and 426. The secondary voltage is considered to be positive if the dotted terminal of the secondary winding has higher potential than the undotted terminal. Although the primary winding is not shown in FIGS. 2–5, the corresponding dot for the primary winding may be assumed to be on the top leg of the primary winding in each of FIGS. 2–5. Therefore, in FIGS. 2–4, a positive voltage applied to the primary winding 22 results in a positive voltage on the secondary winding 126, 226, 326, and 426.

Figure 2:
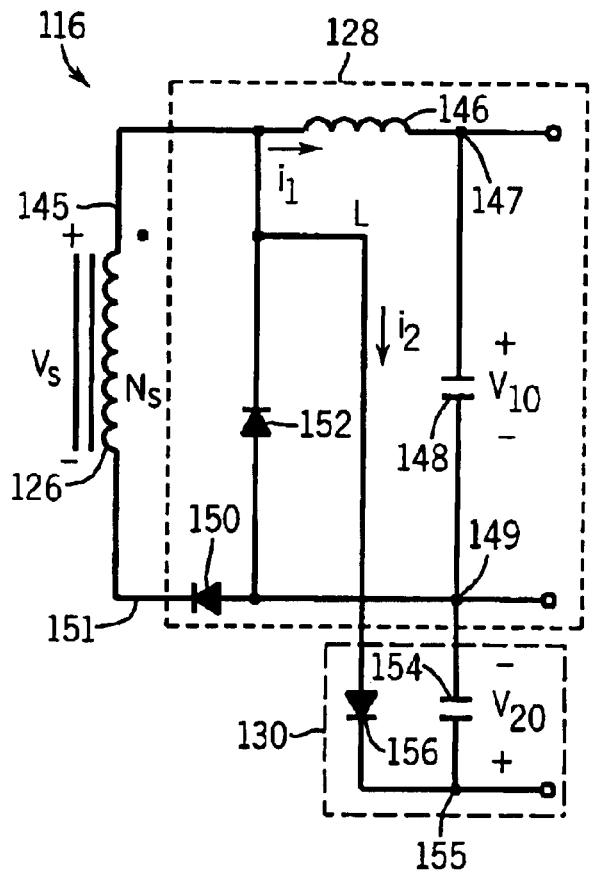
FIG. 2 is a schematic diagram showing a first embodiment of a main rectification circuit and an auxiliary circuit of the dc/dc converter circuit of FIG. 1 in greater detail.

Referring first to FIG. 2, a first embodiment of a rectification circuit 116 according to a preferred embodiment of the invention is shown. The rectification circuit 116 comprises a main rectification circuit 128 and an auxiliary rectification circuit 130. The main rectification circuit 128 further comprises an inductor 146, a first output capacitor 148, a first rectifier 150, and a second rectifier 152. The inductor 146 is coupled between a terminal 145 of the secondary winding and a terminal 147 of the first output capacitor 148. The first rectifier 150 is coupled between the other terminal 151 of the secondary winding and the other terminal 149 of the first output capacitor 148. The second rectifier 152 is coupled between the first terminal 145 of the secondary winding and the second terminal 149 of the output capacitor 148.

The auxiliary rectification circuit 130 further comprises a second output capacitor 156 and a second output capacitor 154. The second output capacitor is coupled to the second terminal 149 of the first output capacitor 148. The third rectifier 156 is coupled between the first terminal 145 of the secondary winding and the other terminal 155 of the second output capacitor 154.

In operation, the primary winding is preferably driven in single ended fashion, such that the primary winding 22 either has a positive voltage or is an open circuit. When a positive voltage is applied to the primary winding 22, the output capacitor 148 is coupled to the voltage $V_s$ across the secondary winding 126 when the rectifier 150 is forward biased. The peak voltage of the secondary winding is used to charge the output capacitor 154 ("peak charging"). At this time, a secondary current flows out of the terminal 145 of the secondary winding. The secondary current is split between two paths. In particular, a first component $i_1$ of the secondary current flows through the inductor 146 and through the output capacitor 148 to charge the output capacitor 148. At the same time, another component $i_2$ of the secondary current flows through the rectifier 156 and the capacitor 154 to charge the second output capacitor 154. The currents $i_1$ and $i_2$ return through the rectifier 150.

When the primary winding 22 is an open circuit, the current that has built up in the inductor 146 continues to charge the capacitor 148 as the energy in the inductor 146 dissipates. This current returns to the inductor 146 through the rectifier 152 which serves as a freewheel diode. Since the rectifier 156 is reverse biased, no current flows through the second output capacitor 154 (i.e., except to the extent that the output capacitor 154 is providing power to the drive control circuit 38).

Although not shown, a conventional reset circuit is preferably also provided to allow current in the secondary winding 126 to dissipate when the voltage applied to the primary winding is zero. The reset circuit may, for example, comprise a reset winding or a passive resistor-capacitor circuit.

Figure 3:
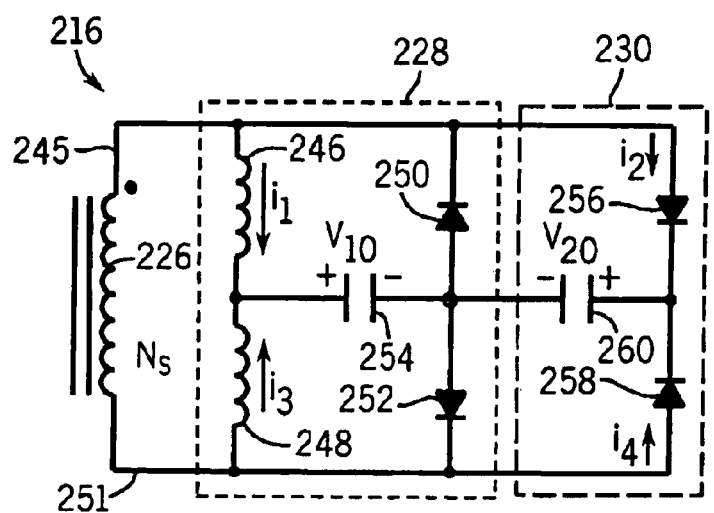
FIG. 3 is a schematic diagram showing a second embodiment of a main rectification circuit and an auxiliary circuit of the dc/dc converter circuit of FIG. 1 in greater detail.

Referring now to FIG. 3, FIG. 3 is a second embodiment of a rectification circuit according to a preferred embodiment of the invention. The circuit 216 comprises a main rectification circuit 228 and an auxiliary rectification circuit 230. The main rectification circuit 228 further comprises a first inductor 246, a second inductor 248, a first rectifier 250, a second rectifier 252, and a first output capacitor 254. The inductors 246 and 248 can each be implemented using an integrated magnetic winding structure that is shared with the secondary winding 226. The rectifier 250 and 252 are connected end to end between first and second terminals of the secondary winding 226.

The auxiliary rectification circuit 230 comprises a third rectifier 256, a fourth rectifier 258, and a second output capacitor 260. The rectifiers 256 and 258 are connected end to end between the first and second terminals of the secondary winding 226. The first output capacitor 254 is connected between a junction of the inductors 246 and 248 and a junction of the rectifiers 250 and 252. The second output capacitor 260 is connected between the junction of the rectifiers 250 and 252 and a junction of the rectifier 256 and 258.

In operation, the primary winding is driven in double-ended fashion. When a positive voltage is applied to the primary winding 22, a current $i_1$ flows through the inductor 246, the first output capacitor 254, and the rectifier 252 to charge the first output capacitor 254. At the same time, a current $i_2$ flows through the rectifier 256, the second output capacitor 260 and the rectifier 252 to charge the second output capacitor 260.

When a negative voltage is applied to the primary winding 22, a current $i_3$ flows through the inductor 248, the first output capacitor 254, and the rectifier 250 to charge the first output capacitor 254. At the same time, a current $i_4$ flows through the rectifier 258, the second output capacitor 260, and the rectifier 250 to charge the second output capacitor 260.

After the primary winding 22 switches from a positive voltage to an open circuit, or from a positive voltage to a negative voltage, the current that is built up in the inductor 246 circulates through the first output capacitor 254 and the rectifier 250 until the energy in the inductor 246 dissipates. In both cases, a voltage is then established across the inductor 248 which produces a current flow through the inductor 248. In the case where the primary winding 22 switches from a positive voltage to open circuit, current through the inductor 248 initially builds up and then dissipates as the energy in the inductor 246 also dissipates. During this time, current flows from the inductor 248, through the first output capacitor 254, and returns through the rectifier 252.

Another advantage of the rectifier circuit 216 of FIG. 3 is that there is a reduction in the peak drain-source voltage of the rectifiers 250 and 252 associated with ringing in connection with the leakage inductance and the drain-source capacitance of the rectifiers 250 and 252. When the rectifier 250 is turned off, the rectifier 250 stops conducting so that the voltage across the rectifier 250 increases from approximately zero to approximately the voltage across the secondary winding 226. This results in a ringing due to the leakage inductance of the secondary winding 226 in connection with the capacitance of the rectifier 250. The voltage across the rectifier 250 has a tendency to become larger than the voltage on the secondary winding 226. However, the rectifier 256 serves to clamp the voltage across the rectifier 250 because the rectifier 256 conducts when the voltage across the rectifier 250 increases above the voltage across the secondary winding 226. This reduces high frequency noise.

Figure 4:
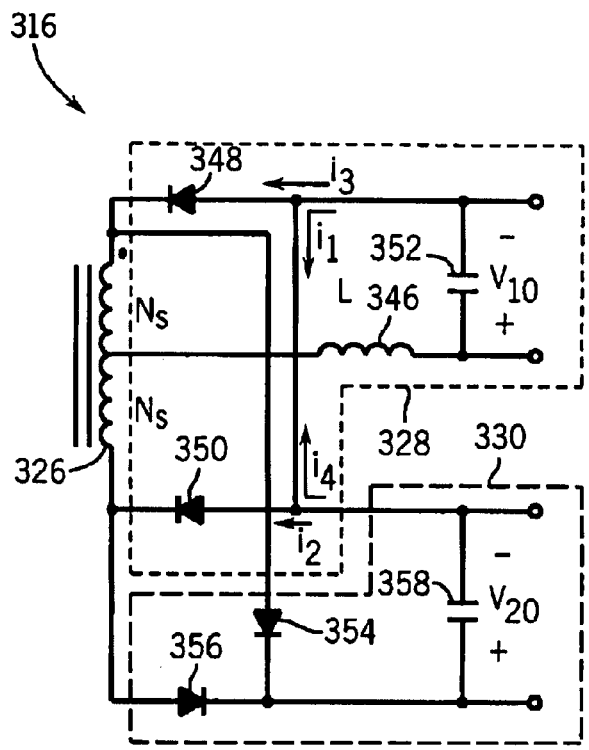
FIG. 4 is a schematic diagram showing a third embodiment of a main rectification circuit and an auxiliary circuit of the dc/dc converter circuit of FIG. 1 in greater detail.

Referring now to FIG. 4, a third embodiment of a rectification circuit according to a preferred embodiment of the invention is shown. The circuit 316 comprises a main rectification circuit 328 and an auxiliary rectification circuit 330. The main rectification circuit 328 further comprises an inductor 346, a first rectifier 348, a second rectifier 350 and a first output capacitor 352. The auxiliary rectification circuit 330 further comprises a third rectifier 354, a fourth rectifier, and a second output capacitor 358. The rectifier 348 is connected between a first terminal of the secondary winding 326 and a first terminal of the first output capacitor 352. The rectifier 350 is connected between a second terminal of the secondary winding 326 and a first terminal of the second output capacitor 358. The rectifier 354 is connected between the first terminal of the secondary winding 326 and a second terminal of the second output capacitor 358. The rectifier 356 is connected between the second terminal of the secondary winding 326 and the second terminal of the second output capacitor 358. The inductor 346 is connected between a third terminal of the secondary winding 326 and a second terminal of the first output capacitor 352.

In operation, when a positive voltage is applied to the primary winding 22, a current $i_1$ flows from the secondary winding 326, through the inductor 346, the first output capacitor 352 and the second rectifier 350 to charge the first output capacitor 352. A current $i_2$ flows from the secondary winding 326, through the rectifier 354, the second output capacitor 358, and the rectifier 350 to charge the second output capacitor 358.

When a negative voltage is applied to the primary winding 22, a current $i_3$ flows from the secondary winding 326, through the inductor 346, the first output capacitor 352, and the rectifier 348 to charge the first output capacitor 352. A current $i_4$ flows from the secondary winding 326, through the rectifier 356, the second output capacitor 358, and the rectifier 348 to charge the second output capacitor 358. When the primary winding 22 is an open circuit, current that has built up in the inductor 346 flows through the first output capacitor 352 and returns through both the rectifier 348 and the rectifier 350.

Figure 5:
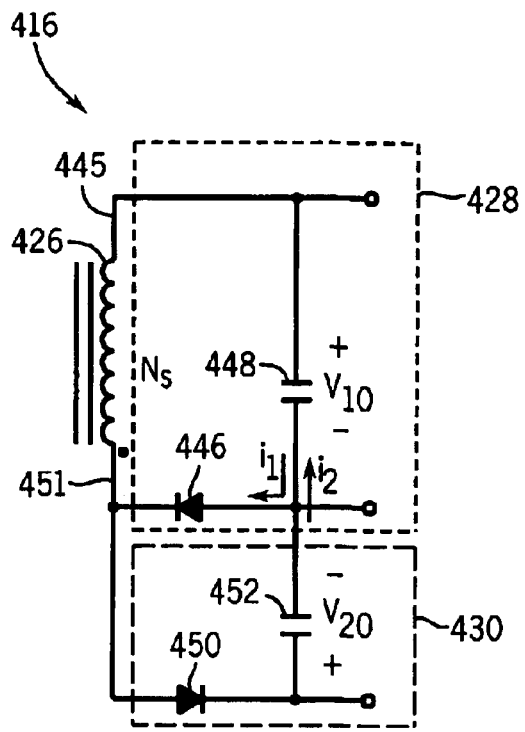
FIG. 5 is a schematic diagram showing a fourth embodiment of a main rectification circuit and an auxiliary circuit of the dc/dc converter circuit of FIG. 1 in greater detail.

Referring now to FIG. 5, a fourth embodiment of a rectification circuit according to a preferred embodiment of the invention is shown. The circuit 416 comprises a main rectification circuit 428 and an auxiliary rectification circuit 430. The main rectification circuit 428 comprises a first rectifier 446 and a first output capacitor 448. The auxiliary rectification circuit 430 comprises a second rectifier 450 and a second output capacitor 452. A first terminal of the first output capacitor 448 is coupled to a first terminal 445 of the secondary winding 426. A first terminal of the rectifier 446 and a first terminal of the rectifier 450 are coupled to a second terminal 451 of the secondary winding 426. A second terminal of the first output capacitor 448 and a second terminal of the rectifier 446 are coupled to a first terminal of the second output capacitor 452. A second terminal of the second output capacitor 452 is coupled to a second terminal of the rectifier 450.

In operation, when a positive voltage is applied to the primary winding 22, a current $i_2$ flows from the terminal 451, through the rectifier 450, and through the second output capacitor 452 to charge the capacitor 452. The current $i_2$ then returns through the charges the first output capacitor 448. Thus, the first output capacitor 448 discharges slightly while the second output capacitor 452 charges. However, the first output capacitor 448 is preferably relatively large by a factor of ten to one hundred as compared to the second output capacitor 452. Therefore, the second output capacitor 452 charges relatively quickly, after which time the rectifier 450 becomes reverse-biased. Thereafter, the remainder of the energy applied to the transformer 14 during the time when the voltage is applied to the primary winding 22 is positive is stored in the transformer core 24 in the form of magnetic flux build-up.

When the primary winding is an open circuit, the flux build-up in the transformer core 24 causes a current i, to flow out of the secondary winding 426. The current $i_1$ flows out of the terminal 445 to maintain flux direction. The current $i_1$ then flows through the first output capacitor 448 and the rectifier 446 to charge the output capacitor 448.

In each of the rectification circuits 116, 216, 316 and 416, the secondary current is split between first and second circuit branches to produce first and second components $i_1$ (plus $i_3$, if present) and $i_2$ (plus $i_4$, if present). The current $i_1$ (plus $i_3$) is used to charge the first output capacitor 148, 254, 352, 448 and the current $i_2$ (plus $i_4$) is used to charge the second output capacitor 154, 260, 358, 452. The following table shows the ratio of the output voltage $V_{20}$ of the auxiliary rectification circuit to the output voltage $V_{10}$ of the main rectification circuit for each of the circuits shown in FIGS. 2–5. The symbol D denotes the duty ratio of the primary switch which corresponds to the ratio of the time interval in which the primary voltage is either positive or negative to the total duration of a switching cycle.

| Topology of Main Rectifier Circuit | $V_{20}:V_{10}$ |
|---|---|
| Forward (FIG. 2) | $\dfrac{1}{D}$ |
| Current Doubler (FIG. 3) | $\dfrac{2}{D}$ |
| Double Ended (FIG. 4) (Half Bridge, Full Bridge or Push Pull) | $\dfrac{2}{D}$ |
| Flyback (FIG. 5) | $\dfrac{1}{D}$ |

For example, assuming a duty cycle of 50%, then the output voltage $V_{20}$ is four times the output voltage $V_{10}$ for the circuits of FIGS. 3–4 and is two times the output voltage $V_{10}$ for the circuits of FIGS. 2 and 5. For example, the output voltage $V_{10}$ may be in a range of about zero to four volts, such as three volts, and the output voltage $V_{20}$ may be in a range of about five to twenty volts, or more particularly in a range of about six to twelve volts.

Figure 5A:
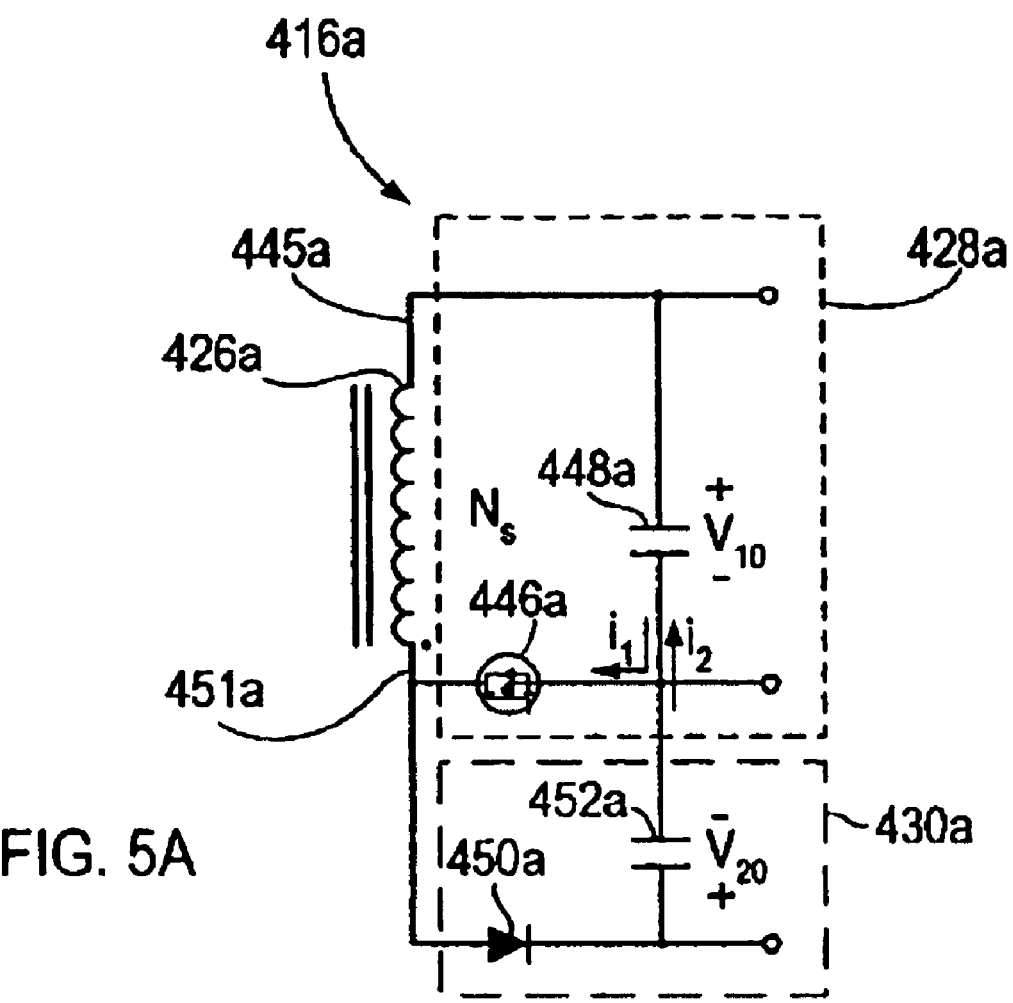
FIG. 5A is a schematic diagram similar to FIG. 5, showing a fourth embodiment of a main rectification circuit and an auxiliary circuit of the dc/dc converter circuit of FIG. 1, but implemented with an alternative rectification circuit utilizing a synchronous rectifier.

In the circuits of FIGS. 2–5, the rectifiers 150, 152, 250, 252, 348, 350, and 446 of the main rectification circuits 128, 228, 328, and 428 may be implemented using synchronous rectifiers (MOSFETs). FIG. 5A, for example, is a schematic diagram similar to FIG. 5 that depicts a circuit 416a, with a main rectification circuit and an auxiliary circuit analogous to circuit 416 in FIG. 5, but with the rectification function in the main rectification circuit 428a accomplished by a synchronous rectifier 446a, rather than the diode 446 of FIG. 5. The remaining circuit elements 426a, 445a, 448a, 450a, 451a, and 452a function in the same manner as the corresponding elements 426, 445, 448, 450, 451, and 452 in FIG. 5. In a like manner, synchronous rectifiers can be substituted for the rectifiers in the main rectification circuits of FIGS. 2, 3 and 4. The rectifiers 156, 256, 258, 354, 356, and 450 of the auxiliary rectification circuits 130, 230, 330, and 430 are preferably schottky diodes. The converter circuit 10 may be used in a variety of different applications, including low voltage (e.g. less than about ten volts, and preferably less than about five volts), high current (e.g., more than ten amps or more than thirty amps) applications.

Advantageously, the converter circuit 10 provides an auxiliary output voltage without requiring an additional secondary winding. This results in decreased size, a simplified transformer structure, and lower manufacturing costs.

Many other changes and modifications may be made to the present invention without departing from the spirit thereof. The scope of these and other changes will become apparent from the appended claims.

What is claimed is:

1. A converter circuit comprising:

a transformer core;

a primary winding, the primary winding being wound around the transformer core;

a secondary winding, the secondary winding being wound around the transformer core;

a main rectification circuit, including a first output capacitor and a rectifier that controls current flow through the first output capacitor;

an auxiliary rectification circuit;

wherein the main rectification circuit and the auxiliary rectification circuit are both connected to the secondary winding and produce output voltages having different magnitudes;

a drive circuit, the drive circuit being coupled to receive a supply voltage;

a drive control circuit, the drive control circuit being coupled to the drive circuit and controlling the drive circuit to apply a pulse width modulated voltage to the primary winding;

wherein the output voltage produced by the auxiliary rectification circuit is provided to the drive control circuit; and wherein the drive control circuit synchronizes operation of the rectifier to the pulse width modulated voltage by using the output voltage produced by the auxiliary rectification circuit to produce a control signal for the rectifier, a magnitude of the voltage of the control signal being determined at least in part by the magnitude of the output voltage of the auxiliary rectification circuit.

2. A circuit according to claim 1, wherein the magnitude of the output voltage produced by the auxiliary rectification circuit is approximately two times the magnitude of the output voltage produced by the main rectification circuit.

3. A circuit according to claim 1, wherein the magnitude of the output voltage produced by the auxiliary rectification circuit is approximately four times the magnitude of the output voltage produced by the main rectification circuit.

4. A circuit according to claim 1, wherein the output capacitor produces a DC output voltage that is less than about ten volts and produces a DC output current that is more than about ten amps.

5. A circuit according to claim 1, wherein the output capacitor produces a DC output voltage that is less than about five volts and produces a DC output current that is more than about thirty amps.

6. The circuit according to claim 1,
wherein the main rectification circuit comprises a first output capacitor and the auxiliary rectification circuit comprises a second output capacitor; and
wherein the output voltage of the main rectification circuit is produced across the first output capacitor and the output voltage of the auxiliary rectification circuit is produced across the second output capacitor.

7. A circuit according to claim 6, wherein a terminal of the first output capacitor is directly connected to a terminal of the second output capacitor.

8. A circuit according to claim 6, further comprising a rectifier, wherein a first current passes through the first output capacitor and the rectifier, and wherein a second current passes through the second output capacitor and the rectifier.

9. A circuit according to claim 6, wherein the output voltage of the main rectification circuit is in a range of about zero to four volts and the output voltage of the auxiliary rectification circuit is in a range of about five to twenty volts.

10. A circuit according to claim 6, wherein the output voltage of the main rectification circuit is about three volts and the output voltage of the auxiliary rectification circuit is about six to twelve volts.

11. A method comprising the steps of:
proving a primary current to a primary winding of a dc/dc converter, the primary winding being wound around a transformer core;
producing a secondary current in a secondary winding in response to the primary current, the secondary winding being wound around the transformer core and being magnetically coupled to the primary winding;
splitting the secondary current between first and second circuit branches to produce first and second components of the secondary current, the first circuit branch comprising a first output capacitor and the second current branch comprising a second output capacitor;
charging the first output capacitor to a first output voltage with the first component of the secondary current;
charging the second output capacitor to a second output voltage with the second component of the secondary current, the second output voltage being different than the first output voltage;
controlling a flow of the first component of the secondary current with a rectifier;
controlling operation of the rectifier with a drive control circuit, the drive control circuit being connected to the second capacitor, the drive control circuit using the second output voltage to produce a control signal for the rectifier, a magnitude of the voltage of the control signal being determined at least in part by the magnitude of the second output voltage;
wherein the primary current is provided to the primary winding using a drive circuit that applies a pulse width modulated voltage to the primary winding; and
wherein the method further comprises controlling the drive circuit with a drive control circuit, the drive control circuit controlling the drive circuit and the rectifier so that operation of the rectifier is synchronized to the operation of the drive circuit.

12. A dc/dc converter circuit comprising:
a transformer core;
a primary winding, the primary winding being wound around the transformer core;
a secondary winding, the secondary winding being wound around the transformer core;
a main rectification circuit, the main rectification circuit being connected to the secondary winding, the main rectification circuit further comprising a first output capacitor and a rectifier that controls current flow through the first output capacitor, and an output voltage of the main rectification circuit being produced across the first output capacitor;
an auxiliary rectification circuit, the auxiliary rectification circuit being connected to the secondary winding, the auxiliary rectification circuit further comprising a second output capacitor, and an output voltage of the auxiliary rectification circuit being produced across the second output capacitor, the output voltage of the auxiliary rectification circuit having a magnitude which is different than a magnitude of the output voltage of the main rectification circuit;
a drive circuit, the drive circuit being coupled to receive a supply voltage; and
a drive control circuit, the drive control circuit being coupled to the drive circuit and controlling the drive circuit to apply a pulse width modulated dc voltage to the primary winding, the drive control circuit controlling the rectifier to synchronize operation of the rectifier to the pulse width modulated voltage, the drive control circuit being connected to receive the output voltage produced by the auxiliary rectification circuit, the drive control circuit being powered by the output voltage produced by the auxiliary rectification circuit to produce a control signal for the drive circuit, the control signal producing a pulse with duration determined at least in part by the magnitude of the output voltage of the main rectification circuit.

13. A circuit according to claim 12,
wherein the main rectification circuit comprises an inductor, a first rectifier, a second rectifier, and a first output capacitor;
wherein the auxiliary rectification circuit comprises a third rectifier and a second output capacitor;
wherein the inductor is coupled between a first terminal of the secondary winding and a first terminal of the first output capacitor;
wherein the first rectifier is coupled between a second terminal of the secondary winding and a second terminal of the first output capacitor;
wherein the second rectifier is coupled between the first terminal of the secondary winding and the second terminal of the output capacitor;
wherein a first terminal of the second output capacitor is coupled to the second terminal of the first output capacitor; and wherein the third rectifier is coupled between the first terminal of the secondary winding and a second terminal of the second output capacitor.

14. A circuit according to claim 12,
wherein the main rectification circuit comprises an inductor, a first rectifier, a second rectifier, and a first output capacitor;
wherein the auxiliary rectification circuit comprises a third rectifier and a second output capacitor;
wherein, in operation, a first current flows from the secondary winding and through the inductor, the first output capacitor, and the first rectifier to charge the first output capacitor; and
wherein, in operation, a second current flows from the secondary winding and through the third rectifier, the second output capacitor and the second rectifier to charge the second output capacitor.

15. A circuit according to claim 12
wherein the main rectification circuit comprises a first inductor, a second inductor, a first rectifier, a second rectifier, and a first output capacitor;
wherein the auxiliary rectification circuit comprises a third rectifier, a fourth rectifier, and a second output capacitor;
wherein the first rectifier and the second rectifier are connected end to end between first and second terminals of the secondary winding;
wherein the third rectifier and the fourth rectifier are connected end to end between the first and second terminals of the secondary winding; and
wherein the first output capacitor is connected between (a) a junction of the first inductor and the second inductor and (b) a junction of the first rectifier and the second rectifier;
wherein the second output capacitor is connected between (a) the junction of the first rectifier and the second rectifier and (b) a junction of the third rectifier and the fourth rectifier.

16. A circuit according to claim 15, wherein the first inductor and the second inductor are each implemented using an integrated magnetic winding structure that is shared with the secondary winding.

17. A circuit according to claim 12,
wherein the main rectification circuit comprises a first inductor, a second inductor, a first rectifier, a second rectifier, and a first output capacitor;
wherein the auxiliary rectification circuit comprises a third rectifier, a fourth rectifier, and a second output capacitor;
wherein, in operation, a first current flows through the first inductor, the first output capacitor, and the second rectifier to charge the first output capacitor when a voltage of a first polarity is applied to the primary winding;
wherein, in operation, a second current flows through the third rectifier, the second output capacitor and the second rectifier to charge the second output capacitor when the voltage of the first polarity is applied to the primary winding;
wherein, in operation, a third current flows through the second inductor, the first output capacitor, and the first rectifier when a voltage of a second polarity is applied to the primary winding, the second polarity being opposite the first polarity; and wherein, in operation, a fourth current flows through the fourth rectifier, the second output capacitor, and the first rectifier when the voltage of the second polarity is applied to the primary winding.

18. A circuit according to claim 12,
wherein the main rectification circuit comprises a first rectifier, a second rectifier, an inductor, and a first output capacitor;
wherein the auxiliary rectification circuit comprises a third rectifier, a fourth rectifier, and a second output capacitor;
wherein the first rectifier is connected between a first terminal of the secondary winding and a first terminal of the first output capacitor;
wherein the second rectifier is connected between a second terminal of the secondary winding and a first terminal of the second output capacitor;
wherein the third rectifier is connected between the first terminal of the secondary winding and a second terminal of the second output capacitor;
wherein the fourth rectifier is connected between the second terminal of the secondary winding and the second terminal of the second output capacitor; and
wherein the inductor is connected between a third terminal of the secondary winding and a second terminal of the first output capacitor.

19. A circuit according to claim 12,
wherein the main rectification circuit comprises a first rectifier, a second rectifier, and a first output capacitor;
wherein the auxiliary rectification circuit comprises a third rectifier, a fourth rectifier, and a second output capacitor;
wherein, in operation, a first current flows from the secondary winding, through the inductor, the first output capacitor, and the first rectifier to charge the first output capacitor when a voltage of a first polarity is applied to the primary winding;
wherein, in operation, a second current flows from the secondary winding, through the fourth rectifier, the second output capacitor, and the first rectifier to charge the second output capacitor when the voltage of the first polarity is applied to the primary winding;
wherein, in operation, a third current flows from the secondary winding, through the inductor, the first output capacitor and the second rectifier to charge the first output capacitor when a voltage of a second polarity is applied to the primary winding, the second polarity being opposite the first polarity; and
wherein, in operation, a fourth current flows from the secondary winding, through the third rectifier, the second output capacitor, and the second rectifier to charge the second output capacitor when the voltage of the second polarity is applied to the primary winding.

20. A circuit according to claim 12,
wherein the main rectification circuit comprises a first rectifier and a first output capacitor;
wherein the auxiliary rectification circuit comprises a second rectifier and a second output capacitor;
wherein the first output capacitor and the first rectifier are connected end to end across the secondary winding; and
wherein the second output capacitor and the second rectifier are connected end to end between (a) a junction of the first output capacitor and the first rectifier and (b) a junction of the secondary winding and the first rectifier.

21. A circuit according to claim 12,
wherein the main rectification circuit comprises a first rectifier and a first output capacitor;
wherein the auxiliary rectification circuit comprises a second rectifier and a second output capacitor;
wherein a first terminal of the first output capacitor is coupled to a first terminal of the secondary winding;
wherein a first terminal of the first rectifier and a first terminal of the second rectifier are coupled to a second terminal of the secondary winding;
wherein a second terminal of the first output capacitor and a second terminal of the first rectifier arc coupled to a first terminal of the second output capacitor; and
wherein a second terminal of the second output capacitor is coupled to a second terminal of the second rectifier.

22. A circuit according to claim 12,
wherein the main rectification circuit comprises a first rectifier and a first output capacitor;
wherein the auxiliary rectification circuit comprises a second rectifier and a second output capacitor;
wherein, in operation, a first current flows from the secondary winding and through the first output capacitor to charge the first output capacitor when a zero voltage is applied to the primary winding;
wherein, in operation, a second current flows from the secondary winding and through the second rectifier, the second output capacitor, and the first output capacitor to charge the second output capacitor when a non-zero voltage is applied to the primary winding; and
wherein, in operation, after the second output capacitor charges when the non-zero voltage is applied, additional energy is stored in the transformer core and the additional stored energy is used to produce the first current when the zero voltage is applied to the primary winding.

* * * * *

UNITED STATES PATENT AND TRADEMARK OFFICE
CERTIFICATE OF CORRECTION

PATENT NO. : 6,775,159 B2 Page 1 of 1
APPLICATION NO. : 10/080026
DATED : August 10, 2004
INVENTOR(S) : Webb et al.

It is certified that error appears in the above-identified patent and that said Letters Patent is hereby corrected as shown below:

In Col. 7, line 31, delete "i," and insert --$i_1$--.
In Col. 11, line 19, claim 15, after 12 insert --,--.

Signed and Sealed this

Thirty-first Day of March, 2009

JOHN DOLL
*Acting Director of the United States Patent and Trademark Office*